Figures 1, 2:
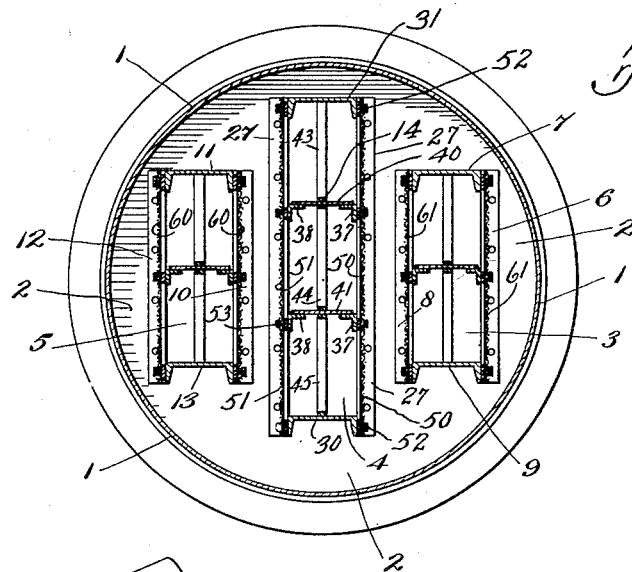

E. W. HASLUP.
FILTER FOR GASES AND LIQUIDS.
APPLICATION FILED JAN. 5, 1920.

1,366,655.

Patented Jan. 25, 1921.

Inventor
E. W. Haslup by
T. W. Witherspoon
Attorney

UNITED STATES PATENT OFFICE.

EDWARD W. HASLUP, OF BRONXVILLE, NEW YORK.

FILTER FOR GASES AND LIQUIDS.

1,366,655.　　　Specification of Letters Patent.　　Patented Jan. 25, 1921.

Application filed January 5, 1920. Serial No. 349,452.

*To all whom it may concern:*

Be it known that I, EDWARD W. HASLUP, a citizen of the United States, residing at Bronxville, in the county of Westchester and State of New York, have invented certain new and useful Improvements in Filters for Gases and Liquids; and I do hereby declare the following to be a full, clear, and exact description of the invention, such as will enable others skilled in the art to which it appertains to make and use the same.

This invention relates to filters for gases and liquids, and has for its object to provide a process and an apparatus which will be more efficient in practice than those heretofore proposed.

With this and other objects in view the invention consists in the novel parts and combinations of parts constituting the apparatus and in the novel steps and combinations of steps constituting the process, all as will be more fully hereinafter disclosed and particularly pointed out in the claims.

Referring to the accompanying drawings forming a part of this specification in which like numerals designate like parts in all the views:—

Figure 1 is a diagrammatic cross sectional view of a filter made in accordance with this invention; and Fig. 2 is an enlarged diagrammatic view of a portion of a foraminous diaphragm made in accordance with this invention.

1 indicates any suitable inclosure or container for the gases, or liquids, to be filtered, 2 any suitable end wall with which said container is provided, and 3, 4 and 5 indicate any suitable openings preferably rectangular in form through said end wall 2, for the passage of said gases, all as disclosed in my co-pending application, Serial No. 348,596, filed Dec. 31, 1919, entitled Metal screens, or separators, for gases.

Around the opening 3 are disposed the foraminous screen holding members 6, 7, 8, and 9; around the opening 4, are disposed the similar holding members 27, 30 and 31; and around the opening 5 are disposed the same type of holding members 10, 11, 12 and 13, as shown.

Firmly secured to said holding members 6, 7, 8 and 9 are the foraminous or reticulated members 61; firmly secured to said holding members 27, 30 and 31, are the similar foraminous or reticulated members 50 and 51; and likewise secured to said members 10, 11, 12 and 13 are the foraminous or reticulated members 60. The said members 7, 9, 11, 13, 30, and 31 are or may be solid so as to confine the gases to be filtered and to force them to pass through the foraminous members such as 50, 51, 60 and 61. Said last named members may be attached to their corresponding holding members by any suitable means such as 52, and if the said foraminous members are extensive in dimensions, as they preferably are, when furnace gases are to be treated, additional bracing or strengthening members such as 37, 38, 40, 41, 43, 44 and 45 may be provided.

The vertically disposed members such as 43, 44, and 45 may be conveniently attached to the solid plate like members such as 40 and 41, by horizontally disposed strips such as 14. The above construction is or may be all in substantial accordance with the disclosures in my said copending application above mentioned; but in providing a filtering apparatus according to this invention, I coat the foraminous surfaces, such as 50, 51, 60 and 61 with a material containing what is now known as activated carbon, which is a form of carbon that has not been heated higher than say 600° C. In other words, I have discovered that if carbon, which has not been heated to a temperature exceeding 600° C. is deposited on a filtering surface such as 51, under proper conditions, the filtering action for gases will be greatly and surprisingly increased, and my present invention, among other features, involves this novel action of said carbon.

To coat a foraminous or reticulated surface 51 with the active material, such as 66, I find it convenient to subject said surface when at a temperature lower than the oncoming gas, to the action of a gas mixture containing a considerable percentage of carbon monoxid and tarry matters, such for example as the gases coming from a coal fed furnace to which the air supply has been restricted. The probable effect of this is to decompose some of the carbon monoxid into carbon dioxid and carbon according to the equation—

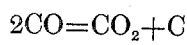

The free carbon thus produced, if the foraminous surface is sufficiently cold, will be deposited at a temperature below 600° C.
and will be what I understand is known as "activated" carbon in that it will have properties different from carbon which has been heated to points above 700° C. or 800° C. In fact, the lower, I cool my oncoming gases the more efficient will be my deposited carbon when acting as a filtering medium. I prefer, therefore, to have the gases at as low a temperature as possible, to chill them as suddenly as possible, and to have as high a percentage of CO gas therein as possible. The best results, I have attained in practice, were from relatively cool gases from an ordinary coal furnace used to heat a boiler for hot water which gases I caused to impinge on a relatively cold reticulated surface such as 51, and thus cooled them down to a temperature of about 300° F., but I attained excellent results also at about 400° F. and 500° F.

The activated carbon thus produced, when deposited along with other matters resembled lamp black in physical appearance, and of course, was associated with more or less tarry or sticky material. Later, when hotter gases are passed through the carbonaceous masses thus obtained, conventionally illustrated on an exaggerated scale at 66, Fig. 2, said masses show themselves under the microscope to be filled with very fine pores, eminently adapted for gases to pass therethrough, and to thus separate out any accompanying very finely divided impalpable dust like particles, which are found to be so difficult to separate in other filters. Further, I find the surfaces 67 (see dotted lines Fig. 2) thus formed, seem to attract said impalpable particles, for said particles readily accumulate on said surfaces and cause the latter to grow as indicated by the dotted lines 68 and 69, while the main body of gases pass on through the openings 65 as is indicated by the arrows 64.

Stated in other language, after depositing my activated carbon on relatively cold metallic wires 60', 61' and 62, and after the sticky carbonaceous deposit 66 has been formed, as just described, the gases owing to their velocity and pressure will still maintain open passages 65 as they travel in the direction of the arrows 64, while a very considerable portion of said gases will pass through the minute pores, not shown, of the carbonaceous mass 66, and thereupon be deprived of a considerable percentage of very minute and impalpable impurities, which would not be separated out by the passages 65 at all. In addition to this very thorough scouring or cleaning action exerted on a portion of the gases by the carbonaceous masses 66, a large percentage of other impurities in the gases are attracted and caught by the outer surfaces of said masses 66, so that the latter gradually grow all over the foraminous or reticulated surfaces not provided with holes 65, as is indicated by the dotted lines 70 and 71.

This growing of the masses 66 continues until it is so persistent that it first gradually, and then more quickly begins to close up said passages 65. When this said closing action begins the gases begin to get cleaner and cleaner, and long before it stops I find the filtered gases to be of such an exceptional purity that they can be used for purposes not possible with gases which have not been subjected to the action of said masses 66. Of course, this closing of the openings 65 would in time stop the passage of the gases altogether, but I find in practice if the foraminous surface is vertically disposed, the weights of the masses 66 are sufficient to detach the latter from their supporting surfaces, and thus substantially no cleaning of the apparatus under ordinary conditions is found to be necessary, other than to clean out the container 1 at intervals.

In some cases I find it desirable to pass the gases through a plurality of foraminous or reticulated sheets such as 51, when said gases prove themselves to be difficult to clean, but in all cases the number of such sheets found necessary is greatly diminished by first depositing the masses 66 thereon.

It is obvious that those skilled in the art may vary the details of both the structure and the procedure without departing from the spirit of the invention, and therefore, I do not wish to be limited to the above disclosure except as may be required by the claims.

What I claim is:—

1. The process of producing a filtering medium which consists in depositing a sticky mass containing carbon, which has not been heated to a temperature exceeding 600° C., on a foraminous surface; and passing gases containing solids over said mass and through said surface until said mass accumulates sufficient weight to detach itself from said surface, substantially as described.

2. The process of separating solids from hot gases containing the same which consists in providing a sticky carbonaceous filtering surface that has not been heated higher than 600° C.; causing said solids to be deposited on said surface and to themselves aid in forming a foraminous mass; and continuing to pass additional portions of said gases containing additional solids over said foraminous mass to separate out additional solids, substantially as described.

3. The herein described new filtering apparatus comprising a foraminous member coated with a sticky carbonaceous mass which has been heated to a temperature higher than 250° F., but less than 600° C., and covered with solid particles from impure gases, substantially as described.

In testimony whereof I affix my signature.

EDWARD W. HASLUP.